United States Patent [19]

Ruble

[11] Patent Number: 4,553,525
[45] Date of Patent: Nov. 19, 1985

[54] BARBEQUE GRILL ASSEMBLY

[76] Inventor: Charles G. Ruble, 2520 S. Fairview, Santa Ana, Calif. 92704

[21] Appl. No.: 603,182

[22] Filed: Apr. 23, 1984

[51] Int. Cl.⁴ .............................................. F24B 3/00
[52] U.S. Cl. ..................................................... 126/30
[58] Field of Search ............... 126/25 A, 30, 29, 9 R, 126/9 B; 248/125

[56] References Cited

U.S. PATENT DOCUMENTS

| | | | |
|---|---|---|---|
| 1,384,250 | 7/1921 | Froom | 248/125 |
| 2,604,884 | 7/1952 | Walker | 126/25 A |
| 2,698,726 | 1/1955 | Howe | 126/30 |
| 4,083,354 | 4/1978 | Claire et al. | 126/25 A |
| 4,320,700 | 3/1982 | Stachowicz | 126/30 |

*Primary Examiner*—Carroll B. Dority, Jr.
*Attorney, Agent, or Firm*—Robert E. Strauss

[57] ABSTRACT

There is disclosed a portable grill assembly for use with an extraneous fire source such as an indoor or outdoor fireplace, fire ring, campfire and the like. The grill assembly includes a grill sub-assembly including a flat grill for supporting a comestible such as a meat product, or wrapped vegetables and the like which is distally supported by an elongated bar having, at its opposite end, an insulated hand grip. The grill sub-assembly is used in combination with a support stand that comprises a base and a vertical standard supported thereon. The position of the grill is infinitely adjustable and, to this end, a support bracket is slideably received over the vertical standard of the stand with a clamp providing adjustable locking to the standard. The clamp provides a rest and a cantilevered support for the grill sub-assembly. This is accomplished by a pair of posts projecting from one side of the bracket. The lowermost post is of greater length than the upper post and projects a greater distance from the face of the bracket. This post is located on a forward edge of the bracket. The upper post, of shorter length, is located at the rear of the bracket and above the first post, whereby the elongated bar of the grill sub-assembly can be mounted there between thus providing a cantilevered support for the grill sub-assembly.

7 Claims, 3 Drawing Figures

BARBEQUE GRILL ASSEMBLY

BACKGROUND OF THE INVENTION

1. Field of Invention

This invention relates to a portable barbeque and, in particular, to a portable barbeque useable with an extraneous fire source.

2. Brief Statement of the Prior Art

A barbeque which has recently been popular in Europe comprises a stand and grill assembly that permits the grill to be positioned over the fire of an indoor fireplace. While this device has enjoyed some popularity, it is difficult to use and, in particular does not disassemble into a portable or compact structure which can be readily packed or stored and does not provide for convenient adjustment of the position of the grill in the fireplace. Ideally, a barbeque assembly should permit dyanmic positioning of the grill above the fire, readily permitting the user to move the grill about the fire to obtain the optimum temperature during the progress of the barbequing operation. This is difficult particularly when the grill is carried on the end of an elongated bar with a single insulated hand grip on the opposite end since most persons do not have sufficient strength to support such a grill when fully loaded with comestibles such as steak, wrapped ears of corn, and the like. The grill assembly should, of course, provide for static retention of the grill, freeing the user to attend to other matters during the barbeque operation. While the prior device have adequately provided for static retention of the grill sub-assembly, heretofore, no attention has been directed to assisting the user in permitting dynamic restraint of the grill during the barbeque operation.

BRIEF STATEMENT OF THE INVENTION

This invention comprises a portable barbeque grill assembly which can be used with extraneous fire sources such as indoor and outdoor fireplaces, outdoor fire rings, campfires, and the like.

The invention comprises a grill sub-assembly having a grill of conventional structure, preferably with a rectangular frame and cross bars in an open grid array which is distally carried on an elongated bar having, at its opposite end, an insulated hand grip.

The grill assembly also comprises a stand having a base that preferably removably supports a vertical standard which receives a sliding bracket. The bracket has a clamp, such as a threadably received thumb screw, to permit its adjustable locking at any desired vertical position on the standard. The bracket also provides a rest for the grill sub-assembly. This rest is a post that projects outwardly from one side of the sliding bracket, preferably along its forward edge. Most preferably, the sliding bracket also has a clamp to provide a cantilevered support of the grill sub-assembly. To this end, a second post is provided, at an elevation above the first post and also projecting from the same side of the sliding bracket. This second post is located rearwardly of the first post and above the first post whereby the elongated bar can be rested on the first post and placed beneath the second post, thereby providing the desired cantilevered support of the grill sub-assembly. Preferably, the first post projects outwardly a greater distance than the second post from the side of the bracket to avoid any obstruction of the second post with the use of the first post as a rest during the dynamic positioning of the grill.

BRIEF DESCRIPTION OF THE DRAWINGS

The invention will be described with reference to the drawings of which.

DESCRIPTION OF PREFERRED EMBODIMENTS

Figure 1:
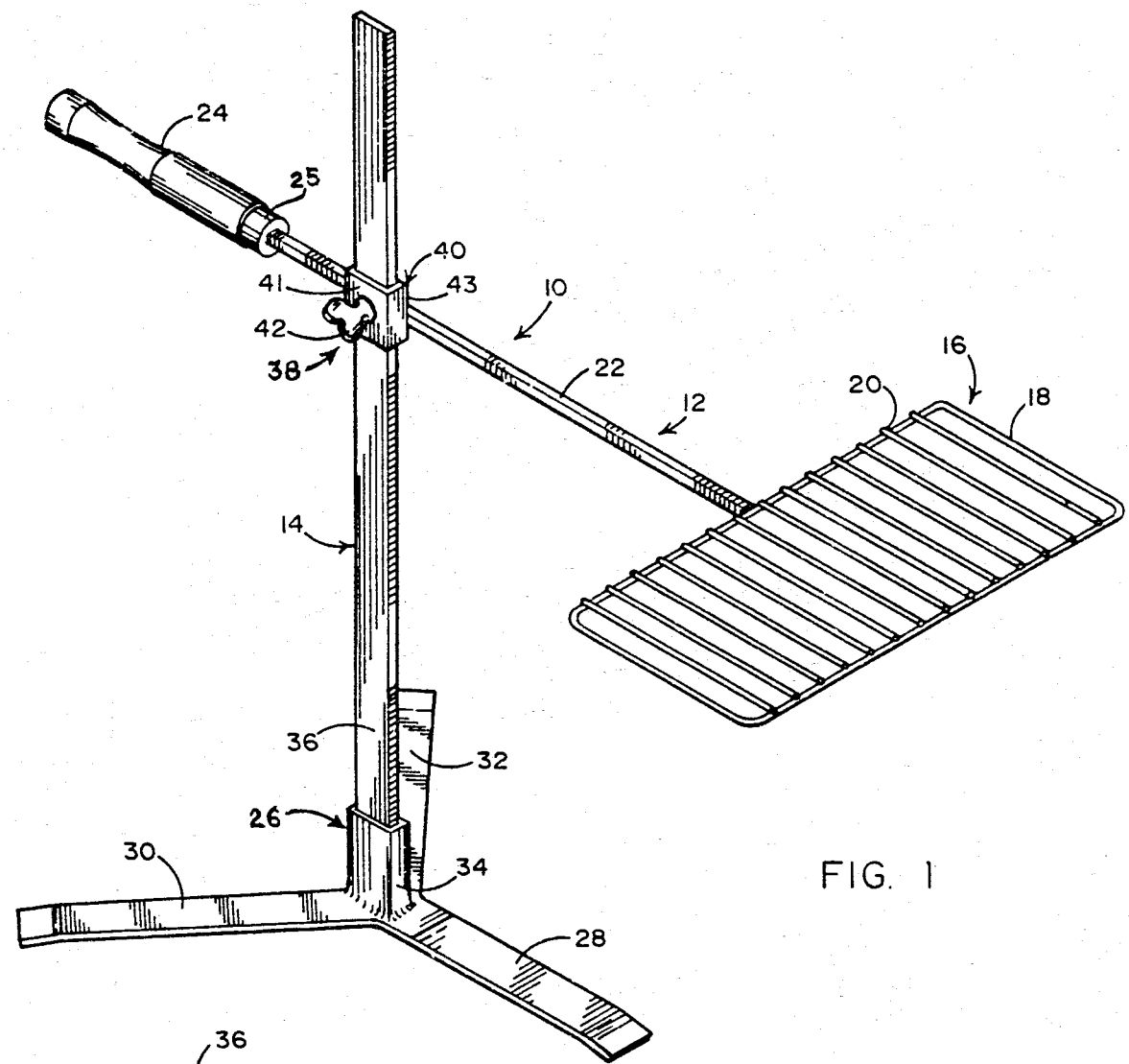
FIG. 1 is a perspective view of the grill assembly of the invention.

Referring now to FIG. 1, the barbeque assembly is shown in perspective view. The assembly comprises a barbeque grill sub-asembly which includes a conventional, rectangular grill 16 having an outer frame 18 with cross bars 20 arranged in a conventional open grid array. The grill 16 is distally mounted on elongated bar 12 of the bar 22 of the grill sub-assembly 12. Bar 22 supports, and its opposite end, an insulated hand grip 24, which is provided with a metal sleeve cap 25 on its forward end.

The grill sub-assembly 12 is supported on the stand 14 with an adjustable clamp 38. Stand 14 comprises a base 26 formed with a central, vertical receptacle 34 and a plurality of radially outwardly projecting legs 28. 30 and 32. While any suitable number of legs can be employed, three legs are preferred as shown and, most preferably, are disposed at equal angular spacings.

Received within the central receptacle 34 is the lowermost end of the vertical standard 36 which, preferably, is in the form of a flat bar. Slideably received on bar 36 is the bracket 40 which comprises a tubular member with an internal slot to receive the flat bar 36. The bracket 40 is provided with clamp means to secure it at any desired vertical spacing on the vertical standard 36 and, for this purpose, a thumb screw 42 is threadably mounted in a internally threaded bore in the wall of bracket 40.

Figure 2:
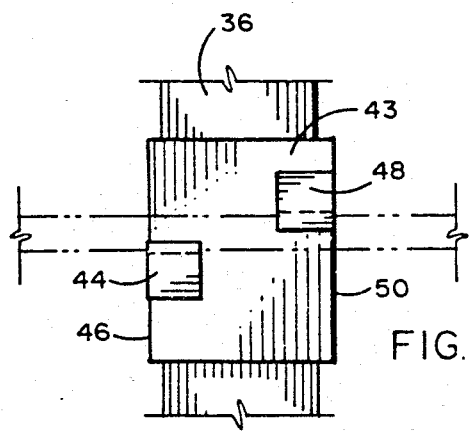
FIG. 2 is a view of the sliding bracket along lines 2—2 of FIG. 1.

Refering now to FIGS. 2 and 3, the structure of the bracket and its function will be described in greater detail. The bracket has a pair of posts 44 and 48 which project outwardly from the side 43, opposite from side 41 which threadably receives the thumb screw 42. As shown in FIG. 2, the lowermost post 44 projects from side 43 adjacent the forward edge 46 of bracket 40 while the uppermost post 48 projects from side 43 adjacent the rearward edge 50 of side 43 of bracket 40. The two posts 44 and 48 are spaced vertically apart a slight distance, approximately the thickness of the elongated bar 22 which is shown in position on bracket 40 by the phantom lines of FIGS. 2 and 3.

Figure 3:
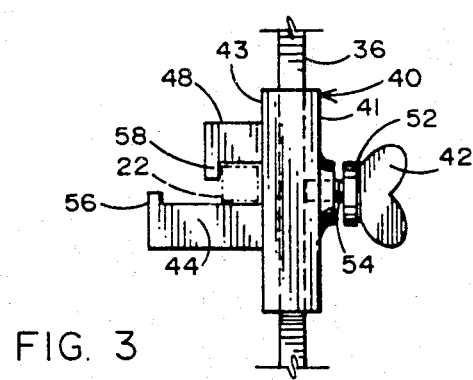
FIG. 3 is an elevational view of the front of the bracket shown in FIG. 2.

Refering now to FIG. 3, the lowermost post 44 projects from the face 43 of bracket 40 a substantial distance further than the upper post 48. Preferably this lower post 44 projects past the end of upper post 48 by a distance which is at least equal to the width of the elongated bar 22 whereby this bar can be rested on lower post 44 without obstruction by upper post 48.

The combination of upper and lower posts provides the cantilevered support for the grill sub-assembly 12. This is secured by the lips such as 56 on lower post 44 and the downwardly dependent lip 48 on upper post 48 which provide a lateral restraint to the elongated bar 22 when the latter is placed between these posts.

The grill sub-assembly is further indexed in cooperation with the bracket 40 for restraint against rotation in its longitudinal axis, i.e., the axis of the elongated bar 22. This is preferably achieved with the illustrated embodiment using an elongated bar having a rectangular, preferably square, cross section and post 44 and 48 of similar cross section. This insures that there is at least one flat surface on each of these elongated bar and coacting posts which cooperate to provide the restraint against rotation of the grill sub-assembly along its longitudinal axis.

In use, the barbeque assembly is positioned as shown in FIG. 1 and a suitably close proximity to a fire source such as a fireplace, campfire and the like. The sliding bracket 40 is positioned in approximately the desired vertical location on standard 14 and thumb screw 42 is tightened to lock the bracket at its desired position. The comestible is placed on the grill 16 and the grill sub-assembly is then placed with the grill over the fire source, resting the elongated bar 22 on the lower post 44. The grill can be moved dynamically through various positions to obtain the most desired position for barbequing, using post 44 as a fulcrum while controlling the position by holding the grill sub-assembly on the hand grip 24. If the barbequing is interrupted momentarily, the user can simply press downwardly on handle 24 sufficiently to permit sliding the elongated bar 22 beneath the lip 58 of the uppermost post 48, thereby engaging and interlocking the grill sub-assembly 12 in a cantilevered support on standard 36.

When it is desired to position the grill in a static position for an extended period of time, the appropriate height of the grill can be readily be adjusted by movement of the sliding bracket 40 and the extension of the grill from the stand can be readily adjusted by sliding it forward or withdrawing it through the support of bracket 40.

If desired, the grill 16 can also include a second frame and cross bar assembly substantially identical to 18 and 20, respectively, which is hinged along one side of frame 18 and which folds over the grill 16 and is locked thereto by hooks to clasp a steak between the two frames, thus permitting rotation of the grill assembly while it supports the steak over the fire or coals.

The invention as thus described provides for a very simple and facile technique of barbequing, permitting utilization of an extraneous fire source and providing an infinitely adjustable positioning on the comestible relative to the fire. The grill assembly further provides the user with the ability to rest the grill sub-assembly on the support post and use this post as a fulcrum while moving the grill towards or away from the fire source to achieve the optimum exposure to the fire source. It further provides for a very simple and foolproof restraint for the cantilevered support of the grill over the fire source.

The entire assembly is very portable and can be readily dismantled for packing and storing. The grill sub-ssembly readily can be disengaged from the stand. The stand can also be disasembled by removing the upright standard 36 from its vertical receptacle 34 of the base. Once disassembled in this fashion, the entire barbeque assembly can be readily stored or packed.

The invention has been described with reference to the illustrated and presently prefered embodiment. It is not intended that the invention be unduly limited by this disclosure of the presently preferred embodiment. Instead, it is intended that the invention be defined by the means, and their obvious equivalents, set forth in the following claims.

What is claimed is:

1. A barbeque grill assembly providing infinitely variable positioning of a grill over a fire which comprises:
    (a) a standard supported on a moveable base;
    (b) a grill sub-assembly including a grill distally supported on an elongated bar with a handle on the opposite end thereof;
    (c) a bracket slideably mounted on said standard with clamp means to adjustably secure said bracket to said standard independently of said grill subassembly and a first post carried by and projecting from the forward edge of one side of said bracket to provide a rest support for said bar and restraining means including a second post of shorter length than said first post and carried by and projecting from the rearward edge of said one side of said bracket and positioned above said first post to provide a cantilevered engagement of said grill sub-assembly when said elongated bar is mounted on said first post and beneath said second post;
    (d) indexing means coextensive the length of said bar and coacting indexing receptacle means on said bracket to restrain said grill sub-assembly against rotation about the longitudinal axis of said elongated bar, and operable at any position of said bar in said bracket; and
    (e) restraining means comprising a first, upwardly facing lip distally carried on said first post and a second, downwardly facing lip distally carried on said second post, whereby said elongated bar is captured between said first and second posts and said grill sub-assembly is laterally restrained against rotation about the axis of said standard.

2. The barbeque grill assembly of claim 1 wherein said indexing means comprises at least one flat surface coextensive the length of said elongated bar and said coacting indexing receptacle means comprises a planar surface on said bracket.

3. The barbeque grill assembly of claim 2 wherein said bar and said first and second posts have rectangular cross sections.

4. The barbeque grill assembly of claim 1 wherein said moveable base has a central receptacle with vertical walls and a mating cross section which removeably receives said standard.

5. The barbeque grill assembly of claim 1 wherein said standard is a flat bar having a rectangular cross section and said clamp has a matching internal slot to receive said flat bar.

6. The barbeque grill assembly of claim 5 wherein said clamp means comprises a screw fastener threadably received in a side of said bracket and projecting into said internal slot to compressively engage the opposing face of said flat bar received in said slot.

7. The barbeque grill assembly of claim 4 wherein said base has a plurality of radial legs permanently attached to, and projecting outwardly from, said central receptacle.

* * * * *